United States Patent
Chicurel Y Uziel et al.

(10) Patent No.: US 9,927,012 B2
(45) Date of Patent: Mar. 27, 2018

(54) DRIVING SCREW AND CHAIN SPEED REDUCER

(71) Applicant: UNIVERSIDAD NACIONAL AUTONOMA DE MEXICO, Distrito Federal (MX)

(72) Inventors: Enrique Jaime Chicurel Y Uziel, Distrito Federal (MX); Filiberto Gutierrez Martinez, Distrito Federal (MX)

(73) Assignee: UNIVERSIDAD NACIONAL AUTONOMA DE MEXICO, Distrito Federal (MX)

( * ) Notice: Subject to any disclaimer, the term of this patent is extended or adjusted under 35 U.S.C. 154(b) by 0 days.

(21) Appl. No.: 14/926,999

(22) Filed: Oct. 29, 2015

(65) Prior Publication Data

US 2016/0348776 A1  Dec. 1, 2016

(30) Foreign Application Priority Data

May 27, 2015 (MX) .................... MX/a/2015/006661

(51) Int. Cl.
*F16H 7/06* (2006.01)
*F16H 25/22* (2006.01)
(Continued)

(52) U.S. Cl.
CPC .............. *F16H 37/02* (2013.01); *F16H 7/06* (2013.01); *F16G 13/06* (2013.01);
(Continued)

(58) Field of Classification Search
CPC .. F16H 25/2252; F16H 2025/228; F16H 7/06; F16H 2007/087; F16H 25/2228; B65G 17/42; F16G 13/02; F16G 13/06
(Continued)

(56) References Cited

U.S. PATENT DOCUMENTS

| 418,328 A | 12/1889 | Willett |
|---|---|---|
| 594,511 A | 11/1897 | Auble |

(Continued)

FOREIGN PATENT DOCUMENTS

| DE | 3305551 A1 | 2/1984 |
|---|---|---|
| DE | 102013007462 A1 | 11/2014 |

(Continued)

*Primary Examiner* — Terence Boes
*Assistant Examiner* — Bobby Rushing, Jr.
(74) *Attorney, Agent, or Firm* — Lucas & Mercanti, LLP

(57) ABSTRACT

An improvement of a worm gear speed reducer is provided where the output gear is substituted by a threaded chain comprised of nut-like threaded bodies mounted on the extended rods of two parallel endless chains, thus the contact surfaces of the drive screw and the threaded chain are much greater than the contact surfaces of the worm gear reducer, and thus the load capacity and wear resistance are much higher. The screw applies the driving force at the centroid of the contact surface of the threaded chain. There are three embodiments which may be a roller screw, a ball screw or a plain translation screw. With the roller screw or the ball screw there is rolling contact and thus the efficiency of the present invention is higher than that of the worm gear reducer which permits it to be used as an amplifier.

15 Claims, 16 Drawing Sheets

(51) Int. Cl.
*F16H 13/06* (2006.01)
*F16H 37/02* (2006.01)
*F16G 13/06* (2006.01)

(52) U.S. Cl.
CPC ...... *F16H 25/2204* (2013.01); *F16H 25/2252* (2013.01); *F16H 2025/228* (2013.01)

(58) Field of Classification Search
USPC ........ 59/78, 84, 93; 74/63, 127, 89.2, 89.23; 464/164; 198/803.2, 867.11, 867.12, 198/803.14, 803.15, 820, 848
See application file for complete search history.

(56) References Cited

U.S. PATENT DOCUMENTS

| | | | |
|---|---|---|---|
| 595,508 A | 12/1897 | Wolander | |
| 626,515 A | 6/1899 | Whitney | |
| 642,430 A * | 1/1900 | Corcoran | F16H 1/16 |
| | | | 74/425 |
| 747,463 A | 12/1903 | Moore | |
| 1,127,684 A * | 2/1915 | Seeberger | B65G 17/38 |
| | | | 474/222 |
| 2,683,379 A | 7/1950 | Strandgren | |
| 3,192,704 A * | 7/1965 | MacRae | B66C 13/12 |
| | | | 59/78 |
| 4,023,433 A | 5/1977 | Schutz | |
| 4,118,995 A * | 10/1978 | Lanz | B21L 9/00 |
| | | | 474/206 |
| 4,172,391 A * | 10/1979 | Dressel | E21B 19/083 |
| | | | 173/145 |
| 4,637,508 A * | 1/1987 | Kikuchi | B65G 17/005 |
| | | | 198/803.2 |
| 7,051,610 B2 | 5/2006 | Stoianovici et al. | |
| 7,222,682 B2 * | 5/2007 | Doering | F16H 7/06 |
| | | | 175/104 |
| 7,410,043 B2 * | 8/2008 | Aulanko | B66B 23/10 |
| | | | 198/333 |
| 8,082,818 B2 | 12/2011 | Sugitani et al. | |
| 8,277,349 B2 * | 10/2012 | Erhart | F16H 3/72 |
| | | | 475/2 |
| 8,544,536 B2 * | 10/2013 | McCulloch | E21B 19/22 |
| | | | 166/384 |
| 9,399,895 B2 * | 7/2016 | Goddard | E21B 19/22 |
| 2014/0238162 A1 | 8/2014 | Chicurel Y Uziel et al. | |

FOREIGN PATENT DOCUMENTS

| | | | |
|---|---|---|---|
| EP | 0426461 B1 | 1/1994 | |
| GB | 777205 A * | 6/1957 | ........... A23G 3/0263 |
| JP | 60168936 A | 9/1985 | |
| JP | 2000097293 A | 4/2000 | |

* cited by examiner

DRIVING SCREW AND CHAIN SPEED REDUCER

CROSS REFERENCE TO RELATED APPLICATION

This application claims the benefit of Mexican Patent Application No. MX/a/2015/006661, filed on May 27, 2015, application which is incorporated herein by reference in its entirety for all purposes.

FIELD OF THE INVENTION

The present invention refers to mechanical transmissions in general, and more specifically to speed reducers and amplifiers.

BACKGROUND OF THE INVENTION

When a great speed reduction ratio is required the worm gear speed reducer is one of the most frequently used. It has, however, some limitations: a low load capacity and excessive wear. The low load capacity and excessive wear are inherent to the particular geometry because the pitch cylinder of the worm has only one point of tangency with the pitch cylinder of the gear and, thus, it has very few teeth of the driven gear in contact with the drive worm.

During the two previous centuries many patents were granted referring to schemes to increase the load capacity of the worm gear reducers by increasing the contact surfaces. The most well-known schemes to achieve this purpose have been, on one hand, a concave configuration of the circumferential toothed surface of the driven gear so that it partially envelops the worm and, on the other hand, a drive worm with a concave silhouette that partially envelops the driven gear. Furthermore, there are double enveloping worm gears that incorporate simultaneously the two configurations described. These schemes have resulted in a tangible increase in the load capacity. However, the load capacity is still quite limited.

In 1897 patent U.S. Pat. No. 595,508 was granted to Wolander referring to the concept of a worm and chain reducer which resembles a worm gear, FIG. 1, but, instead of a driven gear, it drives a pair of chains with threaded links each mounted on a pair of identical sprockets. The worm drives the two chain transmissions. Since the worm is meshed with the threaded chains in the straight portion of the chain transmissions the surfaces in contact may be relatively large and, therefore, the load capacity may be greater than in the single or double enveloped schemes described in the previous paragraph. But, since the worm force has a moment arm with respect to the chainrods, jamming may result between the worm and the threaded links of either chain. In order to reduce this jamming moment arm, the threaded surface of the chain links envelops only a small fraction of the worm surface and this limits the load capacity. Furthermore, in order to minimize this limitation, the worm diameter is oversized, probably beyond that required to transmit the worm force and this implies an increase in the cost, in the volume and in the weight of the speed reducer. This applies as well to patent application JP2000-097293 by Yuuji and published in April 2000, even though in this case there is only one chain transmission, see FIG. 2.

In the schemes so far described the transmission of motion is carried out by sliding contact so the efficiency is low.

U.S. Pat. No. 418,328 granted to Willett and published on December 1889 refers to a mechanism to drive a boat by means of pedals and it includes a speed amplifier made up of a chain with idler rollers that drives a translation screw. In this case the efficiency is raised by the idler rollers. A similar scheme is used in U.S. Pat. No. 594,511 granted to Auble and published on November 1897, but in this case, it refers to the drive system of a land vehicle. Patents: U.S. Pat. No. 642,430 granted to Corcoran and published on January 1900; DE3305551 C2 granted to Reguzzi and published on September, 1990, FIG. 3; and U.S. Pat. No. 7,222,682, granted to Doering and DuPree published on May, 2007, also refer to chains with idler rollers that drive a translation screw. In all the patents mentioned in this paragraph the use of the idler rollers raises the efficiency, but their load capacity is limited because there is only one row of rollers per translation screw and because each roller makes contact with the translation screw only on a very short line segment.

Patents: U.S. Pat. No. 626,515, granted to Whitney and published on June, 1899; and U.S. Pat. No. 747,463, granted to Moore and published on December 1903, FIG. 4, refer to worm gear reducers which include idler rollers on the driven gear, which reduce friction, thus raising the efficiency. But, as has already been mentioned, this type of reducers have a limited load capacity due to their basic geometry and also because there are very few rollers which make contact with the drive worm.

In the last few decades there has been a great deal of interest in energy saving in general. In the particular case of worm gear reducers, patents have been granted, and continue being applied for, that involve concepts to make them more efficient by means of a plurality of balls that roll between the threads of the drive worm and the driven gear in a closed circuit, i.e., after rolling in the helical threads they enter a conduit that returns them to the helical path to start over. In this manner the sliding contact between the worm and the gear is substituted by a rolling contact which raises the efficiency of the reducer. These patents include the mutual partial envelopment of worm and gear to increase the load capacity but, as has already been pointed out, it is still limited by the restrictions imposed by the basic geometry of the worm and gear. Examples of this are: U.S. Pat. No. 4,023,433, granted to Schutz on May, 1977; patent application JP60-168936A by Tatsuo and Kazuharu, published on September, 1985; patent EP 0426461B1 granted to Ohtsuka and published on January, 1994; U.S. Pat. No. 7,051,610, granted to Stoianovici and Kavoussi on May, 2006; and patent application DE102013007462 A1 by Klaus published on November, 2014, FIG. 5.

Other patents which may be considered relevant prior art, as far as the roller screw used in the first embodiment of this invention is concerned, are U.S. Pat. No. 2,683,379, granted to Strandgren on July, 1954 and U.S. Pat. No. 8,082,818 granted to Sugitani on December, 2011. These patents do not refer to any speed reducer, they refer to the roller screw which is used in mechanical actuators and to activate the linear displacement of machine tool tables. The roller screw is driven by an internally threaded tube, but there are also inverted roller screws in which the tube is driven by the screw. The inverted roller screw refers basically to an assembly made up of a central sun screw, a plurality of threaded planetary rollers, and all of this is located inside an internally threaded tube. The threaded planetary rollers orbit around the central sun screw as they roll between it and the internally threaded tube driving the threaded tube in a straight line.

Patent application MX/a/2013/002354 and patent application US2014/0238162A1, now U.S. Pat. No. 9,234,570 B2 by Chicurel and Gutierrez refer to a screw and threaded chain speed reducer. The screw threads engage the threads of the single roller chain so that, as the screw turns, it drives the chain linearly. The force of the drive screw has a moment arm with respect to the chain rods, and this resulting moment may cause jamming between the drive screw and the "threaded bodies". In contrast to this, in the speed reducer of the present invention, there is a threaded chain made up of a plurality of threaded bodies mounted on two parallel roller chains with extended rods. The extended rods serve as supports and also as pivots of the threaded bodies, and the centroid of the threaded surface of the threaded bodies is located in the plane of the extended rods, and therefore, the force that the screw exerts on the threaded chain is also located in said plane, thus in this arrangement there is no jamming moment.

BRIEF DESCRIPTION OF THE INVENTION

In order to facilitate the description of the invention the following definitions will be used: "threaded body" is a block with a threaded bore; "roller chain", the one used in this invention is provided with extended rods that support the threaded bodies; "threaded link" is an assembly of a threaded body and two links of roller chain, one on each side of the threaded body, and four extended rods; "threaded chain" is a chain made up of threaded links.

The present invention may be considered as a transformation of a worm gear reducer, and it comprises three embodiments. The reducer is made up of a high speed assembly and a low speed assembly. In the high speed assembly the worm is substituted, in the first two embodiments, by rolling contact drive screws: an inverted roller screw in the first embodiment and a ball screw in the second embodiment. In the third embodiment the worm is substituted by a conventional translation screw with sliding contact.

In the low speed assembly the gear is substituted by a threaded chain transmission which is made up of a threaded chain and, at least, two pairs of sprockets, each pair mounted on an output shaft, and the bearings that support said shafts. The threaded transmission chain is driven by the screw. Of course, the threads of the threaded chain are different for each embodiment since they have to agree with the threads of the drive screw, which is different in each case.

Following is a comparison between the present invention and a worm gear reducer. In the first two embodiments of the present invention, the efficiency is, at least, as high as the efficiency of the worm gear reducer, because there is rolling contact between the inverted roller screw, or the ball screw, and the links of the threaded chain. The rolling contact makes it possible to use this invention also as an amplifier. The load capacity is increased in all three embodiments of the present invention because the contact of the threaded chain with the drive screw takes place in a straight portion of the threaded chain, which can be as long as desired, and thus, in a large surface. Furthermore, each threaded link envelops in a great proportion the threaded surface of the drive screw. While in the worm gear reducer it takes place in the very small areas of contact of very few teeth of the gear with the worm.

As in the case of the worm and gear reducer, one turn of the screw in each of the three embodiments of the present invention produces a small fraction of a turn in the output shafts, i.e., there is a great reduction of angular displacement and, consequently, a great reduction of speed.

In the three embodiments an additional reduction may be obtained using the principle of the differential screw.

For the same input speed, the same input power and the same reduction ratio, there is a greater load capacity and a greater wear resistance in the three embodiments of the present invention than in the worm and gear reducer.

The efficacy of the inverted roller screw, as far as the increase of both the load capacity and the efficiency are concerned, has been amply confirmed by its application in commercial mechanical actuators.

Objectives of the Invention

One objective of the present invention, in its three embodiments, is to provide a speed reducer with a high load capacity.

Another objective of the present invention, in its two first embodiments, is to provide a high efficiency speed reducer/amplifier.

Another objective of the present invention, in its three embodiments, is to provide a high reduction speed reducer.

Another objective of the present invention, in its three embodiments, is to provide a speed reducer with high wear resistance.

Another objective of the present invention, in the two first embodiments, is to provide a speed reducer/amplifier with a high load capacity, with a high efficiency, with a high reduction or amplification ratio and with a high wear resistance, all of this simultaneously in a single unit.

Another objective of the present invention, in the third embodiment is to provide a speed reducer with a high load capacity, a high reduction or amplification ratio, a high wear resistance and a lower cost than that of the first two embodiments, all of this simultaneously in a single unit.

DETAILED DESCRIPTION OF THE INVENTION

Figure 9:
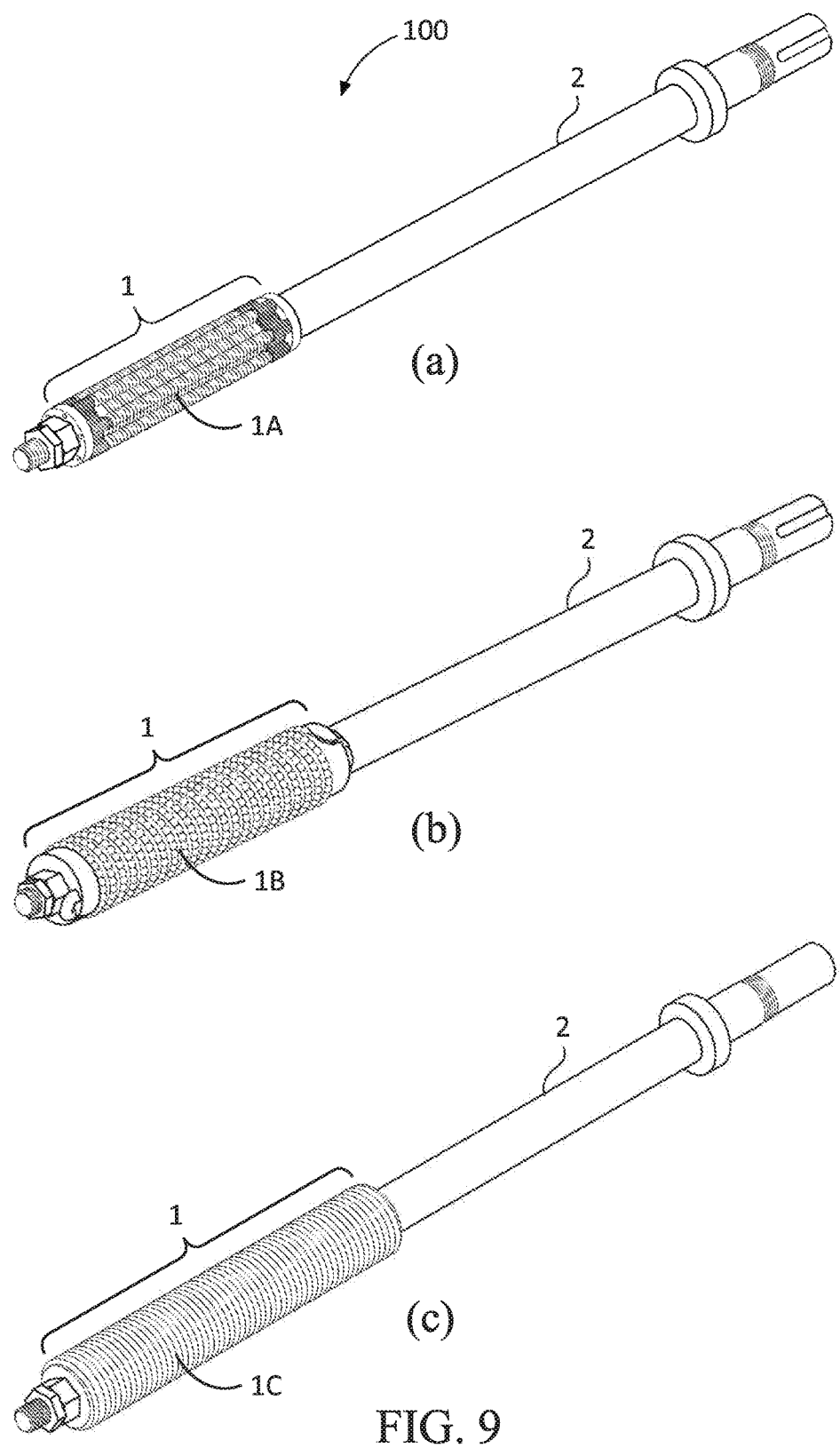
FIG. 9 shows the drive screw: (a) an inverted roller screw in the case of the first embodiment, (b) a ball screw in the case of the second embodiment, and (c) a conventional translation screw with sliding contact in the case of the third embodiment. The supporting bearing is not shown in this figure.
Figure 10A:
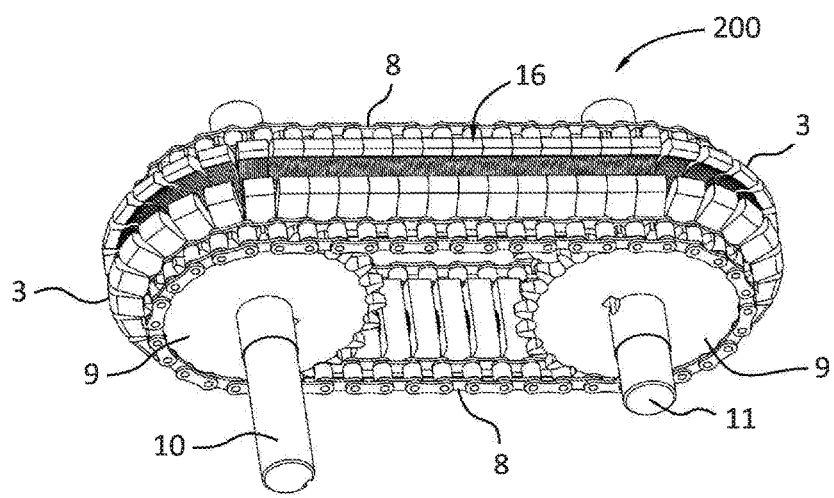
FIG. 10a shows the low speed assembly. The supporting bearings are not shown in this figure.

The speed reducer of the present invention is made up of a high speed assembly (100), FIG. 9a, and a low speed assembly (200), FIG. 10a. The high speed assembly (100) is made up of a drive screw (1) with its shaft (2) and its bearing and their supports (not shown), The low speed assembly (200), is made up of: a threaded chain (16), FIG. 10b, at least two pairs of sprockets (9), two shafts (10) and (11), FIG. 10c, and four bearings (not shown) for shafts (10) and (11). Said bearings may be supported on pedestals or flanges or on the reducer housing, or in some other conventional manner Instead of bearings, pillow blocks may be used.

In what follows the three embodiments require a special numbering system. The drive screws are designated as follows: (1A), (1B), and (1C) corresponding to the first, second and third embodiment respectively, FIG. 9. The threaded bodies are designated as: (3A), (3B) and (3C) corresponding to the first, second and third embodiment respectively, FIG. 15. However, when referring to characteristics which are common to the three embodiments the drive screw is designated by number (1), and the threaded bodies are designated by number (3).

In the first embodiment the drive screw (1) is an inverted roller screw (1A), FIG. 9a; in the second embodiment it is a ball screw (1B), FIG. 9b; and in the third embodiment it is a conventional translation screw with sliding contact (1C), FIG. 9c.

First Embodiment

Figure 1:
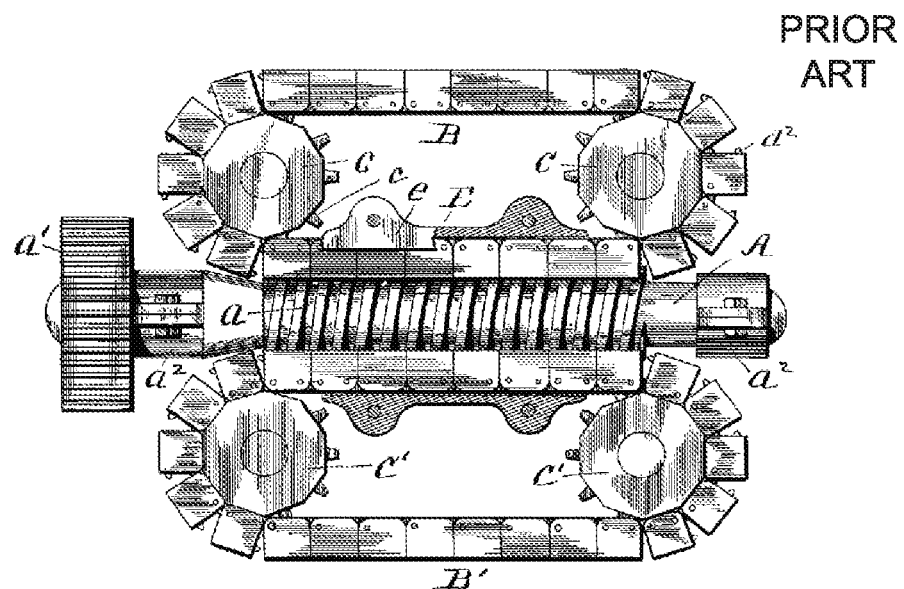
FIGS. 1, 2, 3, 4, and 5, refer to concepts in prior art.
Figure 2:
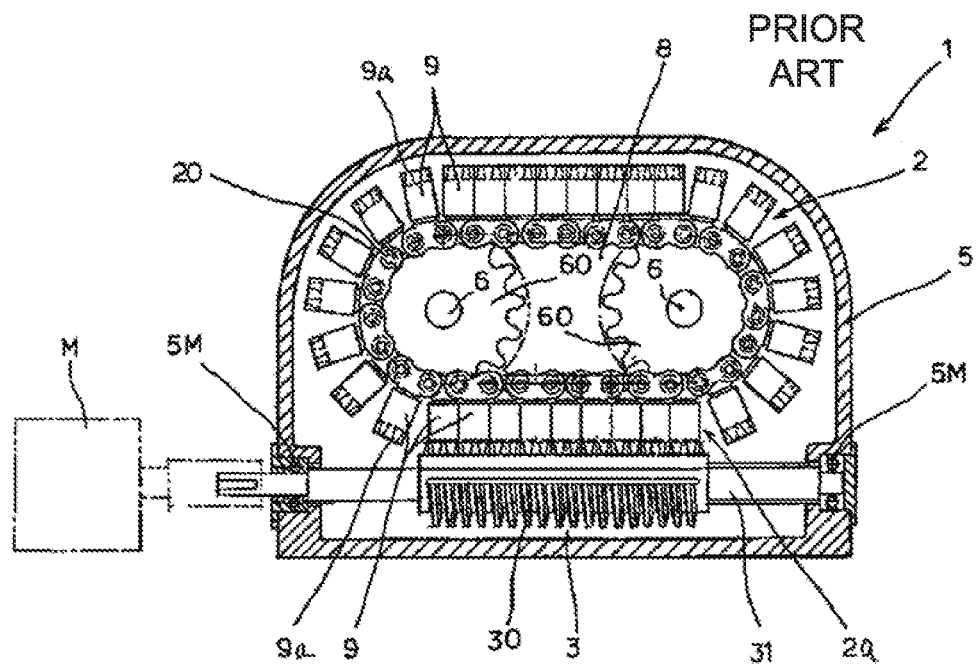
Figure 3:
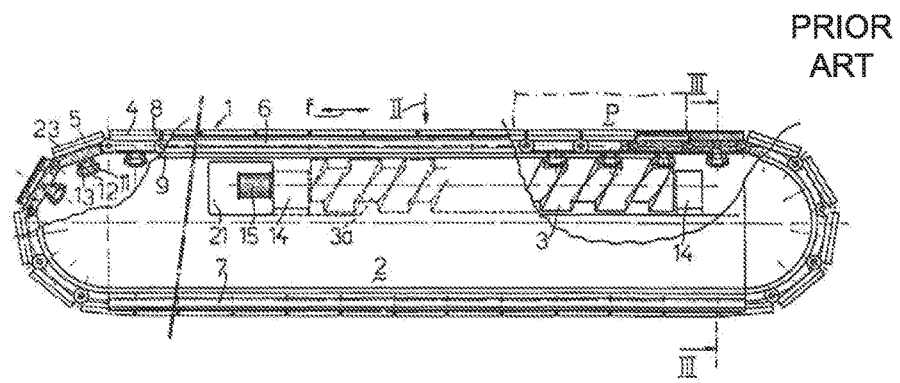
Figure 4:
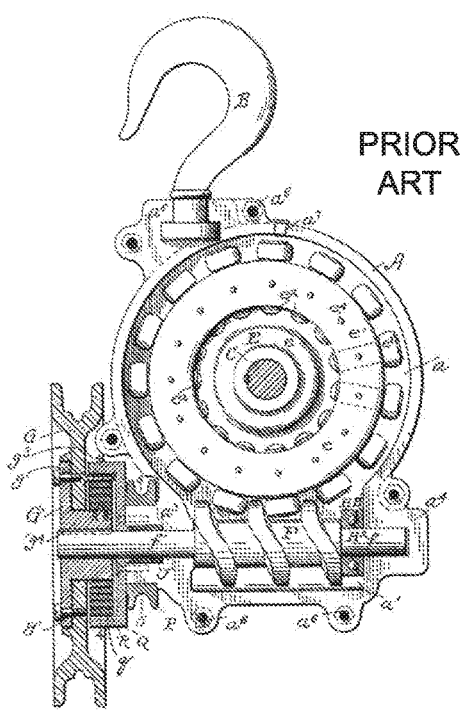
Figure 5:
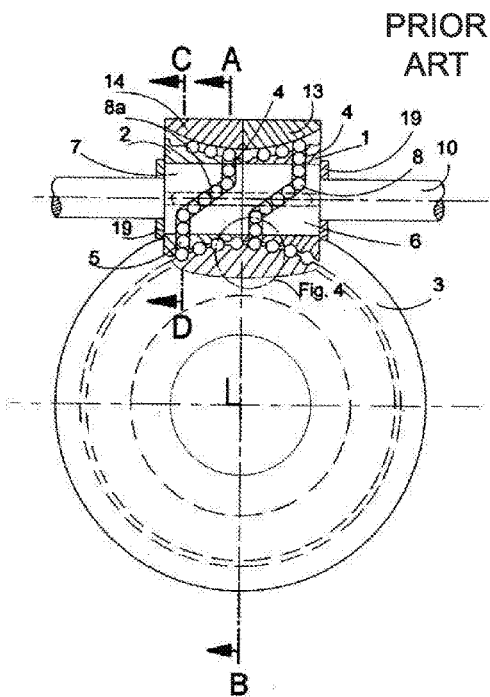
Figure 6:
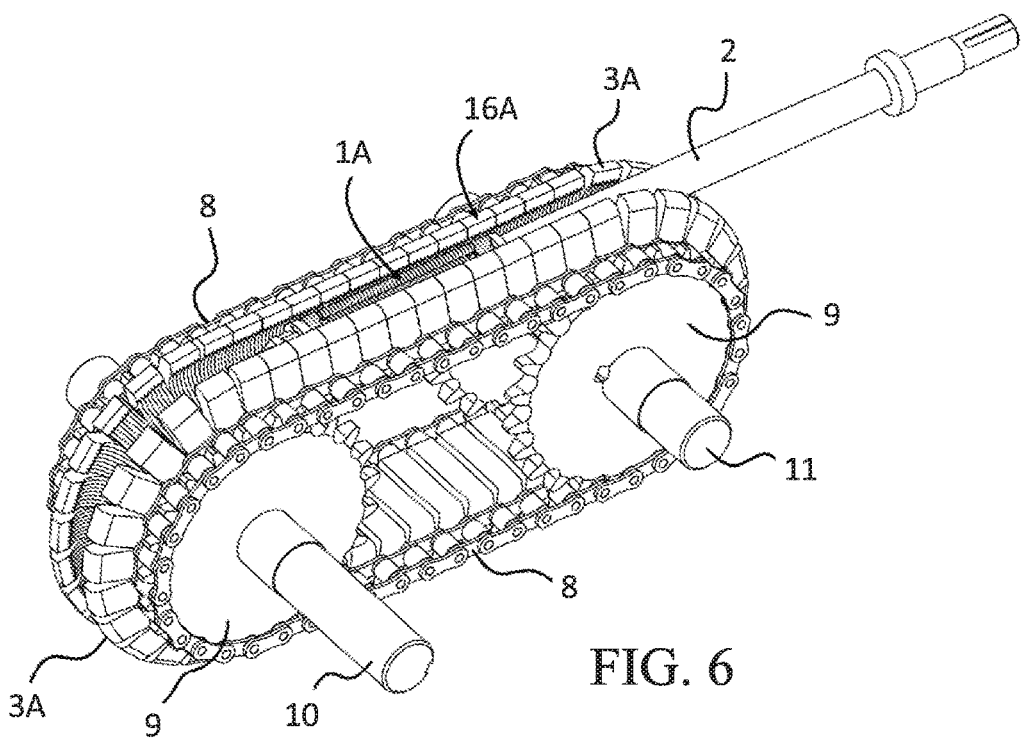
FIG. 6 is a view of the first embodiment of the reducer/amplifier with an inverted roller screw.
Figure 7:
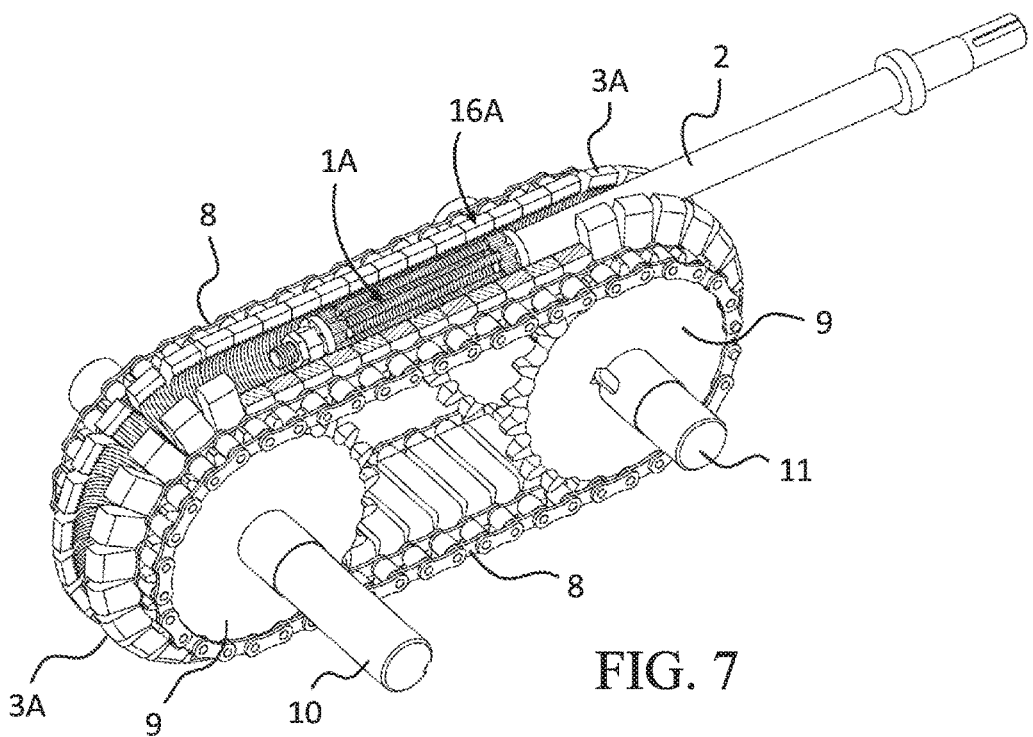
FIG. 7 is a view of the first embodiment with a cut in a few threaded bodies to show part of the inverted roller screw.

Following is a description of the preferred first embodiment. With reference to FIGS. 6 and 7, a motor (not shown) makes the inverted roller screw (1A) rotate. The inverted roller screw (1A) drives the threaded chain (16) in a straight line by means of its planetary threaded rollers (4), FIG. 8, that roll in between the central sun screw (5) and the threaded bodies (3A) which are part of the threaded chain (16), FIG. 10b. The threaded bodies (3A) have a gap (6), FIG. 15, to let shaft (2) through when said threaded bodies are turning around the sprockets (9), FIG. 10c. The gap (6) subtends an angle φ, of less than 180°, FIG. 17d.

Figure 8:
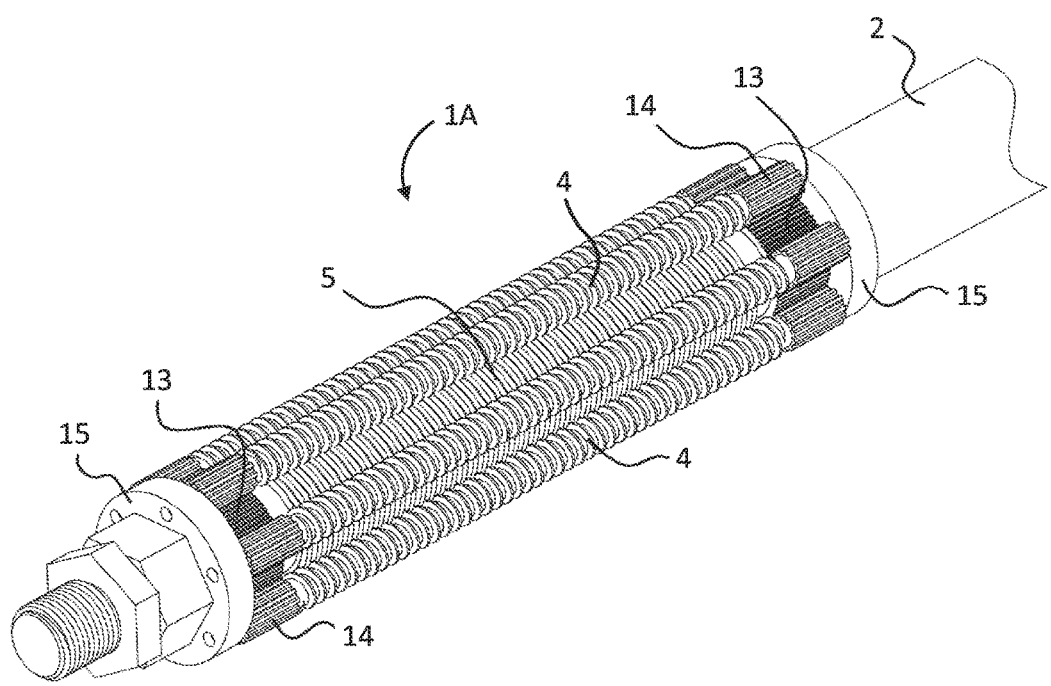
FIG. 8 shows the inverted roller screw of the first embodiment.

On the ends of the central sun screw (5), FIG. 8, there are gears (13) integral with it. On the ends of the planetary threaded rollers (4) there are pinions (14) integral with them. The pinions (14) engage the gears (13). The gears (13) and the pinions (14) are used in order to avoid circumferential sliding between the planetary threaded rollers (4) and the central sun screw (5), thus promoting pure rolling. The planetary threaded rollers (4) are mounted on rings (15), these rings keep the rollers (4) at the correct separation. Since there is rolling contact between the central sun screw (5) and the planetary threaded rollers (4) and also between the planetary threaded rollers (4) and the threaded bodies (3A), the efficiency of the inverted roller screw (1) is as high as that of a worm gear reducer, i.e., around 90%, but the inverted roller screw has this efficiency in considerably greater intervals of speed and helix angles than the work gear reducer. This means that this first embodiment of the invention may be used also as a speed amplifier, in which case, the reduction ratio is converted into an amplifying ratio.

When this first embodiment of the invention is used as a speed reducer, shaft (2) is the input shaft and (10) and (11) are the output shafts. When this first embodiment of the invention is used as an amplifier, one of the shafts (10) or (11), or both, are the input shafts, and (2) is the output shaft.

The roller screw (1A) can be located in either the upper or the lower straight portions of the threaded chain (16A). There could also be two roller screws (1A), one in the upper straight portion and one in the lower straight portion of the threaded chain (16A).

Second Embodiment

Figure 11:
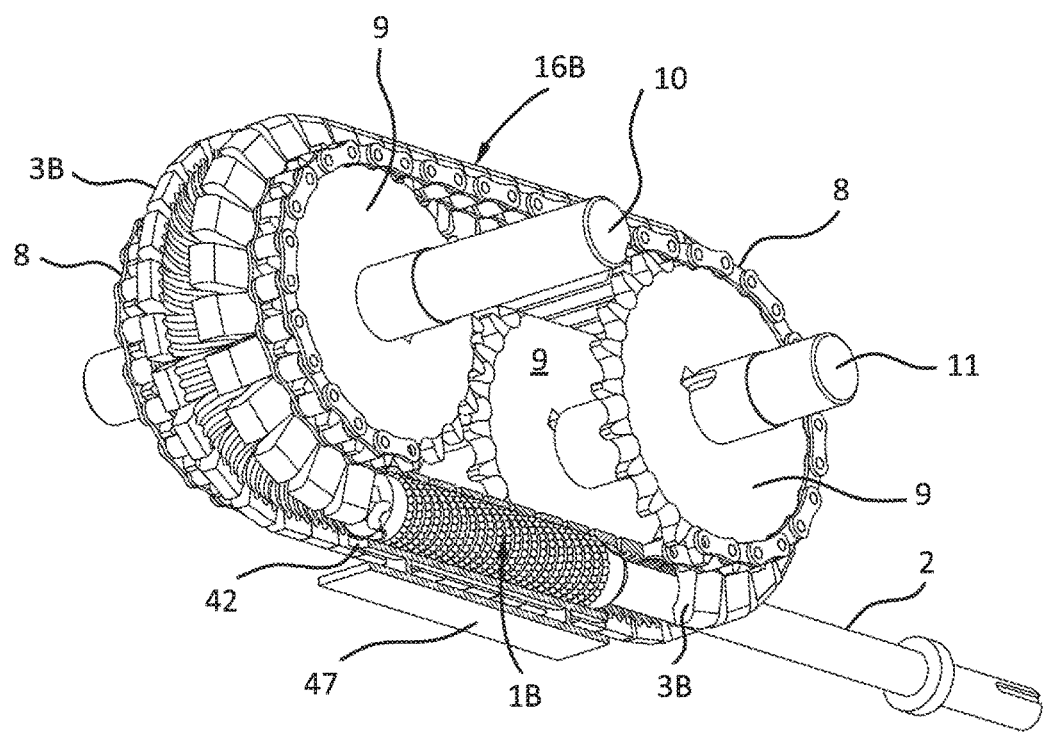
FIG. 11 is the second embodiment of the reducer/amplifier, with part of the threaded links cut away to show the ball screw and its relation to the ball retainer.

Following is a description of the second embodiment of the invention. FIG. 11 shows the ball screw speed reducer, with part of the threaded chain (16B) cut away in order to show its spatial relation with the ball retainer (42).

The efficiency of the ball screw is as high as that of the worm gear but the ball screw has this efficiency for greater intervals of speeds and reduction ratios than the worm gear reducer. This means that this second embodiment of the invention may also be used as a speed amplifier.

Just as in the case of the first embodiment, when this second embodiment of the invention is used as a speed reducer, shaft (2) is the input shaft and (10) and (11) are the output shafts. When this second embodiment of the invention is used as an amplifier, one of the shafts (10) or (11), or both, are the input shafts, and (2) is the output shaft.

Figure 12A:
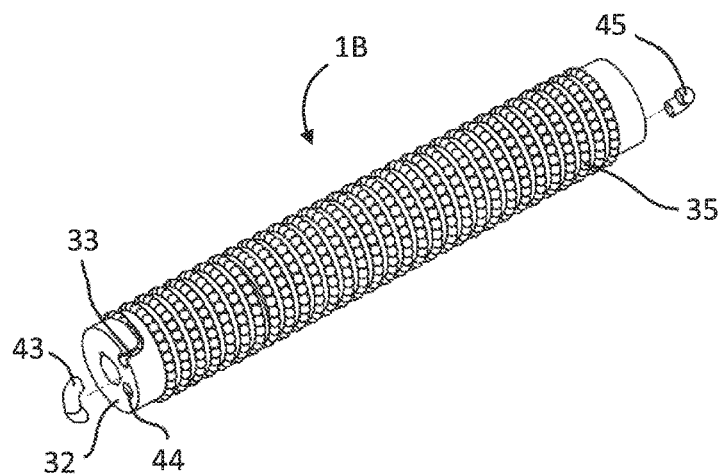
FIG. 12a shows the ball screw with the ball recirculation conduits, showing the external curved tubes separated from the ball screw.

The ball screw (1B) has a plurality of circulating balls (35), FIG. 12a, that roll and drive the threaded chain (16B). The balls (35) roll between the helical thread (36) of cylinder (32), FIG. 12b, and the helical thread (37) of the threaded bodies (3B), FIG. 15b. Both threads (36) and (37) have identical helix angles and they have a transverse section that may be the arc of a circle or "V" shaped or any other adequate shape. Both threads, (36) and (37) together form a helical conduit for the rolling balls (35).

Due to the gap (6) in the threaded bodies (3B), FIG. 15b, thread (37) is not continuous, it is intermittent. The ball screw (1B) is located preferably in the lower straight portion of the threaded chain (16B) so that an oil pool may be provided to wet the chain, as it moves along, lubricating it. But the ball screw (1B) could also be located in the upper straight portion of the threaded chain (16B). Of course, there could be two drive screws, one on the lower straight portion and one on the upper straight portion of the threaded chain (16B).

Figure 13:
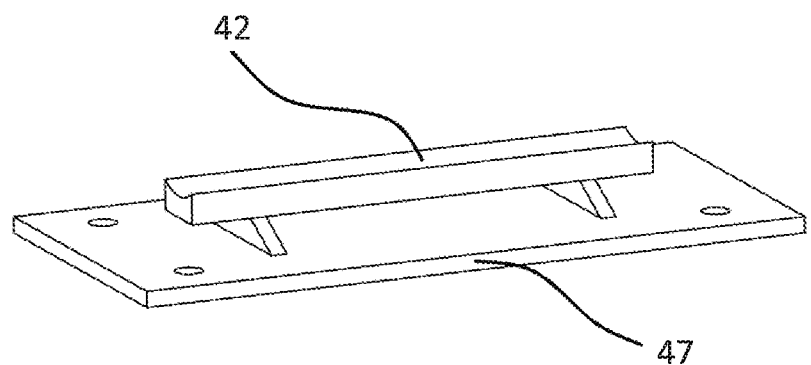
FIG. 13 shows the ball retainer of the second embodiment.
Figure 14:
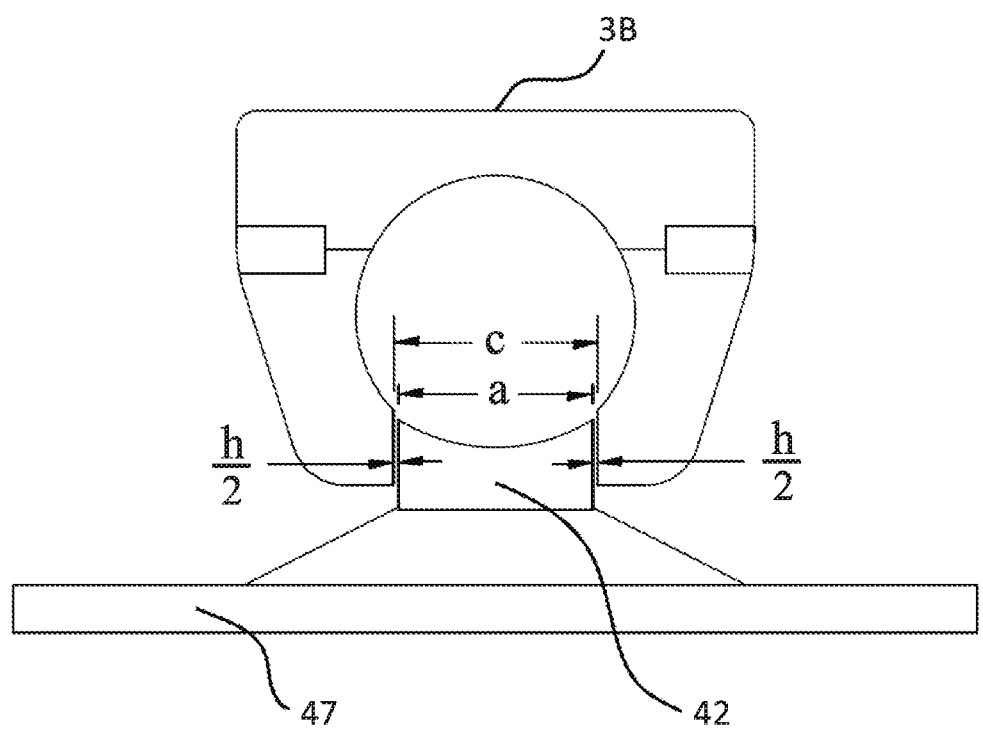
FIG. 14 shows the location of the ball retainer in relation with the threaded bodies.

The ball retainer (42) has a concave cylindrical upper surface, FIG. 13, and its function is to keep the balls (35) tracked in the helical thread (36) of the cylinder (32) while they cross the gap (6) of the threaded bodies (3B). There is a clearance "h" between the width "c" of the gap (6) of the threaded bodies (3B) and the width "a" of the ball retainer (42), h=c-a, FIG. 14.

The ball retainer (42) may be integral, or not, with its pedestal (47), FIG. 13. The pedestal (47) may have a different form than the one shown in FIG. 13.

Figure 12B:
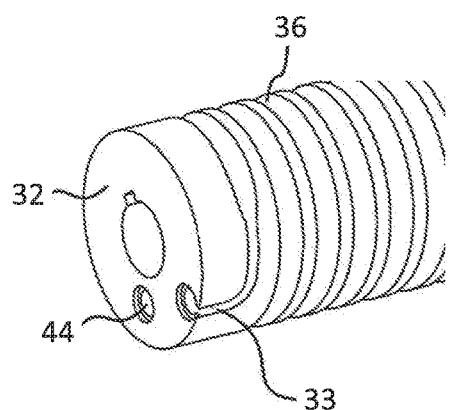
FIG. 12b is the detailed view of one end of the ball screw, without the balls, showing the exit and return conduits for the balls.
Figure 12C:
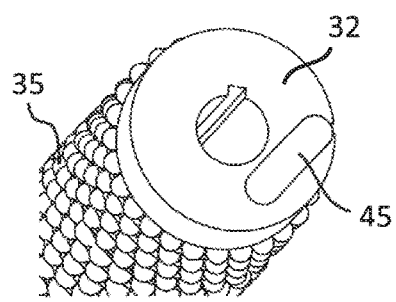
FIG. 12c shows a detail of an end of the ball screw, including the balls, and with the curved return tube in position of operation.

When the balls (35), FIG. 12a, reach the exit of thread (36) at the end of cylinder (32), FIG. 12b, they go under and into the curved exit tunnel (33), that leads them into the curved exit tube (43), FIG. 12a, which makes them turn around 180° and leads them into the straight return conduit (44) located within cylinder (32) and parallel to its longitudinal axis. The straight ball return conduit (44) goes from one end to the other end of cylinder (32), where the balls enter an arrangement made up by an entrance curved tube (45), FIG. 12c, and an entrance curved tunnel (45) that leads the balls (35) back into the helical thread (36) so that they may continue to circulate in the helical conduit made up of thread (36) of cylinder (32) and the thread (37) of the threaded bodies (3B). The entrance arrangement into helical thread (36) is identical to the exit arrangement at the other end of cylinder (32). Elements (43) to (45) make up the return conduit of the balls. This return conduit together with the curved tunnels, at the entrance and the exit, and the helical conduit made up by the threads of the cylinder (32) and the threaded bodies (3B), make up the circulation circuit of the balls (35).

Third Embodiment

Figure 19:
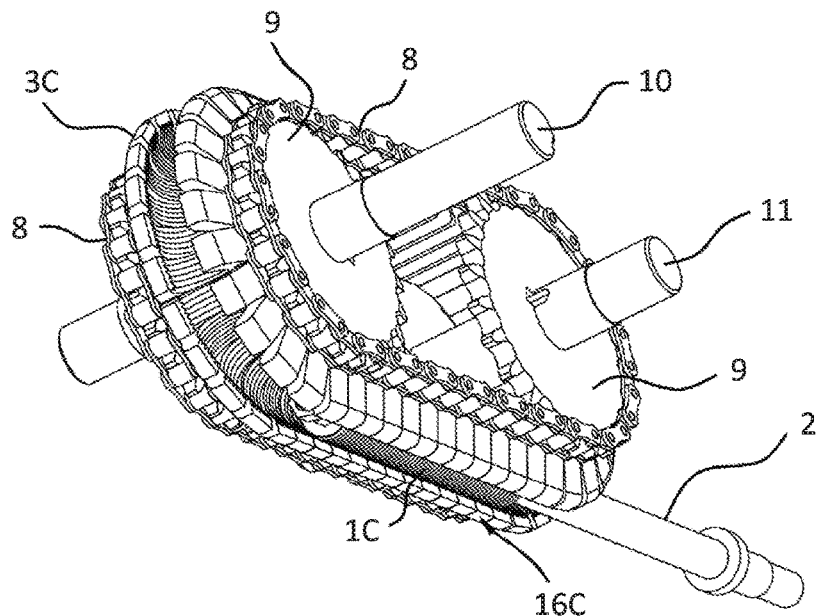
FIG. 19 is a view of the third embodiment of the invention, with a conventional translation screw.

The third embodiment of this invention is a speed reducer made up of a conventional, sliding contact translation screw (1C) and a threaded chain (16C), FIGS. 9c and 19. The advantage of this embodiment is its much lower cost than either one of the first two embodiments. The sliding contact implies increased friction and lower efficiency than in the two first embodiments and thus it would be convenient to use in this embodiment a rather large angle of advance in order to facilitate sliding and, in this manner, obtain a more acceptable efficiency. In other words, it would be recommendable to use lower reduction ratios in this third embodiment than in the case of the first two embodiments.

The thread could be square, Acme or of any other form. Even though the square thread is more efficient, the preferred form is Acme because of the ease of manufacturing.

The sliding contact translation screw (1C) can be located in either the upper or the lower straight portions of the threaded chain (16C). There could also be two translation screws, one in the upper and one in the lower straight portion of the threaded chain (16C).

Low Speed Assembly

Figure 15:
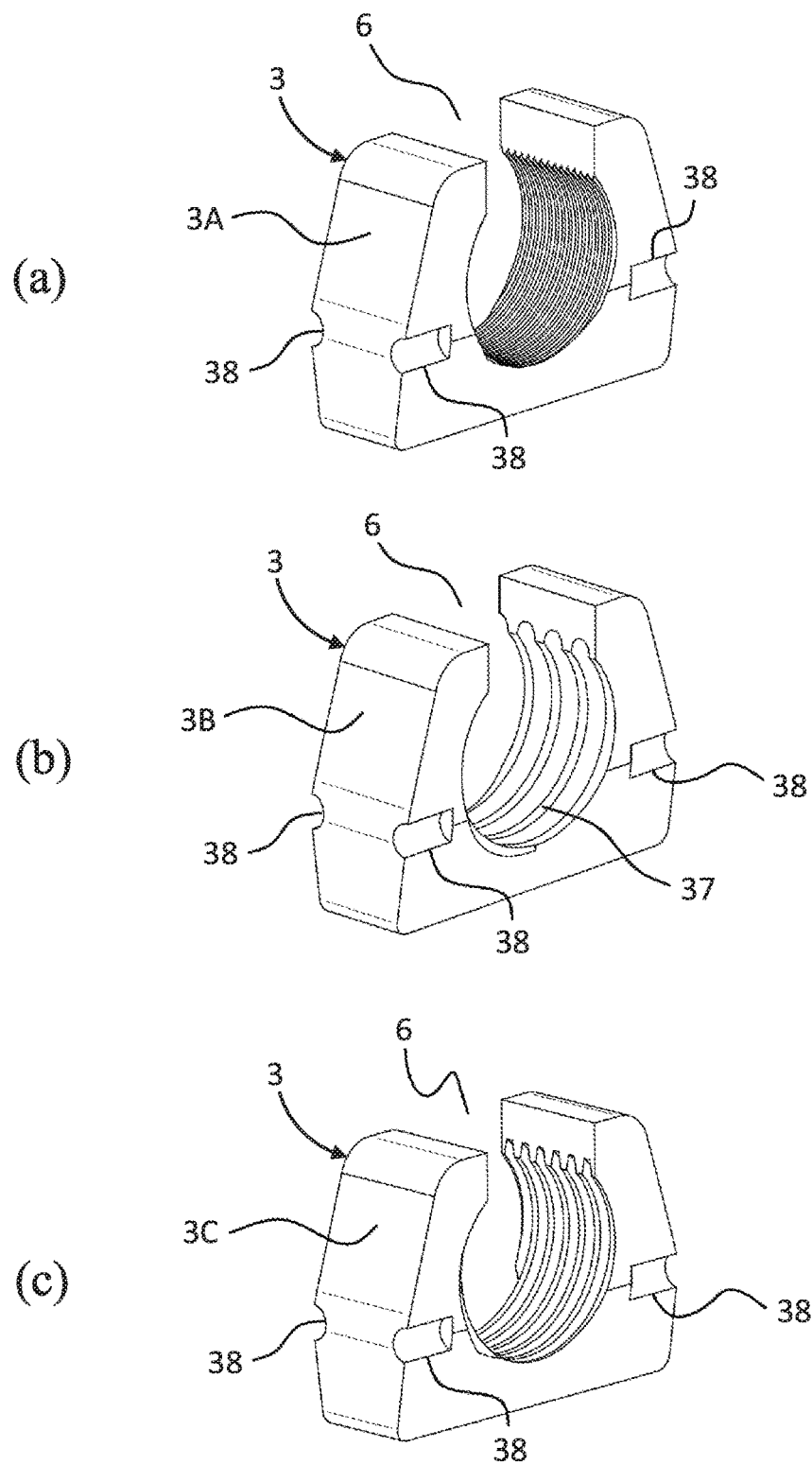
FIG. 15 shows a threaded body: (a) of the first embodiment with an inverted roller screw, (b) of the second embodiment with a ball screw, (c) of the third embodiment with a conventional translation screw with sliding contact.

The low speed assemblies (200) are the same for the three embodiments of this invention except for the thread of the threaded bodies (3), FIG. 15, which must be the same as the thread of the drive screw (1), FIG. 9, which is different for each embodiment.

Figure 10B:
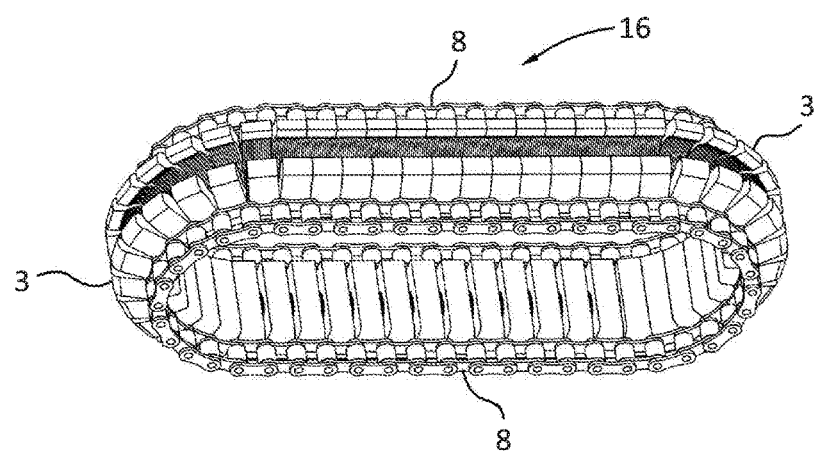
FIG. 10b shows the threaded chain.
Figure 10C:
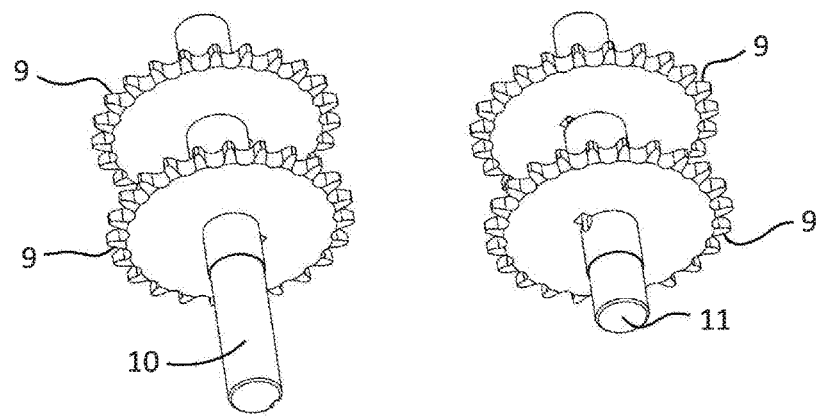
FIG. 10c shows the two output shafts with a pair of sprockets on each shaft.

The low speed assembly (200), FIG. 10a is made up of a threaded chain (16), FIG. 10b, and, at least two pairs of sprockets (9), and two shafts, one for each pair of sprockets, FIG. 10c, and their supporting bearings, which are not shown in said figures.

Figure 17A:
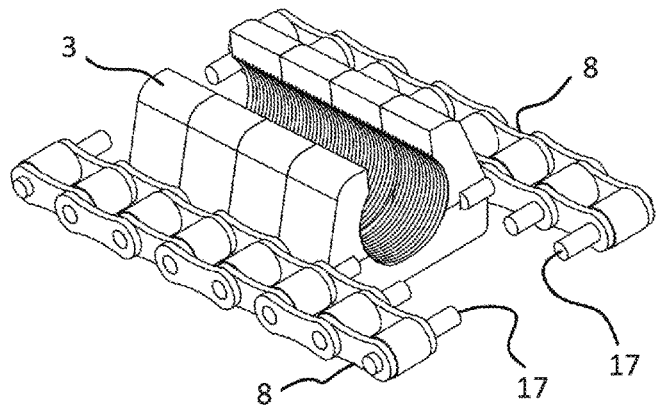
FIG. 17a shows a few threaded bodies assembled in two stretches of the parallel roller chains with extended rods.

The threaded chain (16), FIG. 10b is made up of a plurality of threaded bodies (3) and two parallel endless roller chains (8) with extended rods (17), FIG. 17a, that have the double function of supporting the threaded bodies (3) and act as pivots to allow said threaded bodies to turn as they transit around each sprocket pair (9).

Figure 22:
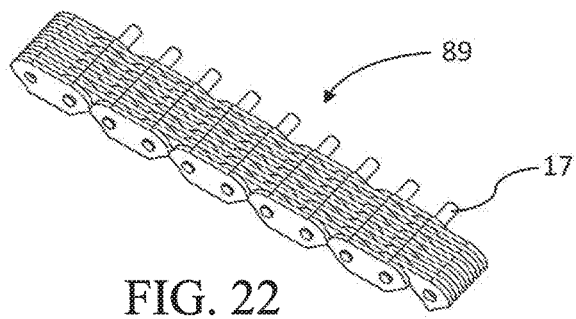
FIG. 22 shows an inverted tooth chain with extended rods.
Figure 23:
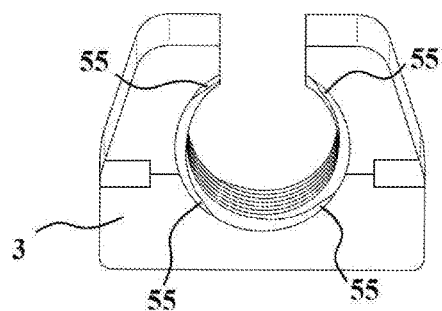
FIG. 23 shows a threaded body with multiple entrance thread (55).
Figure 24:
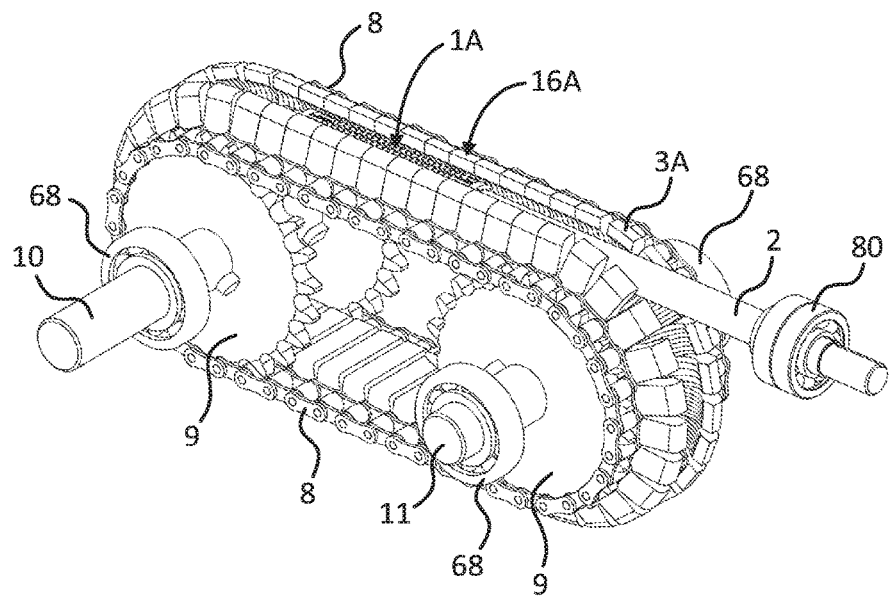
FIG. 24 is a view of the first embodiment of the reducer/amplifier with an inverted roller screw showing the shaft bearings

It must be pointed out that the speed reducer of the patent applications MX/a/2013/002354 and US 2014/0238162 A1 by Chicurel and Gutierrez has a threaded chain that is made up of a single roller chain with brackets to support a plurality of threaded bodies, while in the reducer of the present invention the plurality of threaded bodies is supported by two parallel chains (8) with extended rods (17), FIGS. 10b and 17a. The threaded bodies (3) are mounted on the extended rods (17). The extended rods (17) also act as pivots of the threaded bodies (3) when they turn around the sprockets (9). The parallel chains can be roller chains (8) or silent chains (89), FIG. 22.

The threaded chain (16), when mounted on the sprockets (9) has an oval shape made up of two semicircular arcs and two straight tracts, FIGS. 6 and 7. The drive screw (1), located in one of said straight tracts drives the threaded chain (16) and this produces an angular displacement of the four sprockets (9).

The sprockets (9) rotate with their shafts (10) and (11) because they are either keyed or splined to said shafts or the shafts are integral with the sprockets. Shafts (10) and (11) are the output, low speed, shafts supported on bearings (68). The pair of sprockets (9) may have different diameters with the purpose of having two different reduction ratios, one for each of the output shafts (10) and (11). Of course, the two pairs of sprockets (9) may have equal diameters.

Figure 16A:
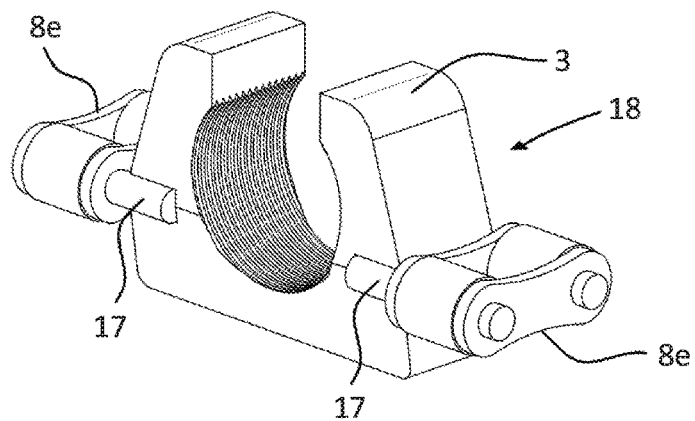
FIG. 16a shows a threaded link. The specific form of the thread shown in this figure is that of the first embodiment. For the second and third embodiments the configuration is similar, but the threads are different.
Figure 16B:
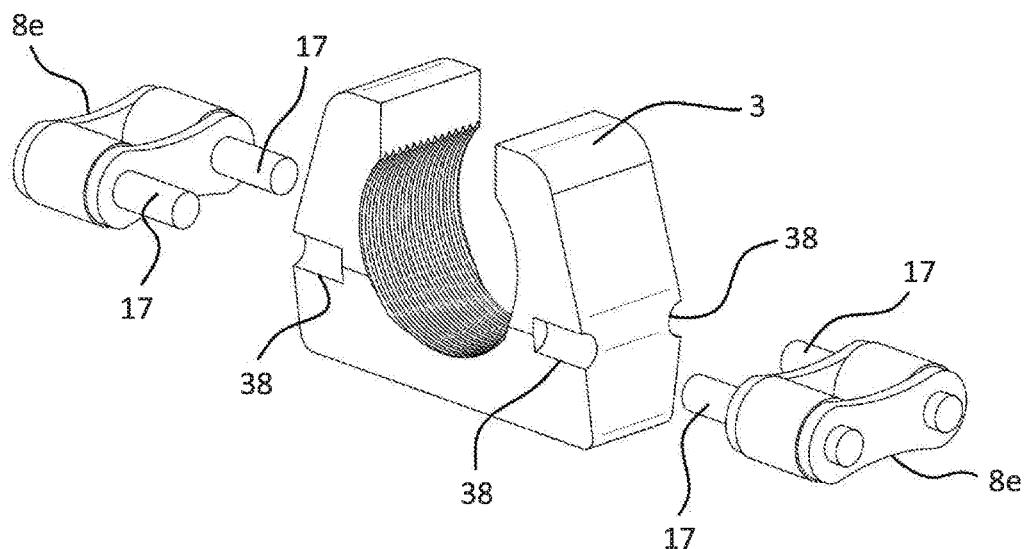
FIG. 16b is the threaded link of FIG. 16a disassembled.

Each of the threaded bodies (3) has four grooves (38), two in the front and two in the back, with cross sections in the form of an arc of a circle, FIG. 16b. The extended rods (17) of the roller chain (8) are inserted in the grooves (38), FIG. 16a. Each extended rod (17) fits in the grooves (38) of two adjacent threaded bodies, FIGS. 17a and 17b.

Each threaded body (3) is mounted on two pairs of extended rods (17), one pair belonging to one parallel roller chain on one side, and the other pair belonging to the other parallel chain on the other side, FIG. 16b and FIG. 17a. Thus each extended rod (17) is shared by two threaded bodies (3), one next to the other, FIGS. 17a and 17b. The four grooves (38) of each threaded body (3), as well as the four extended rods (17), are located in the centroidal plane of the threaded surface of the threaded body (3) and, consequently the axial force that the drive screw (1) exerts on the threaded chain (16) is also located in this centroidal plane and, thus, it exerts no potentially jamming moment on the threaded chain (16).

In contrast with the present invention, in the speed reducers of: the U.S. Pat. No. 595,508 by Wolander, the patent application JP2000-097293 by Yuuji and the patent applications MX/a/2013/002354 and US 2014/0238162 A1 by Chicurel and Gutierrez, the drive screw force is located at a considerable distance from the chain rods so that there is a moment which could cause jamming between the drive screw and the threaded bodies.

Figure 17B:
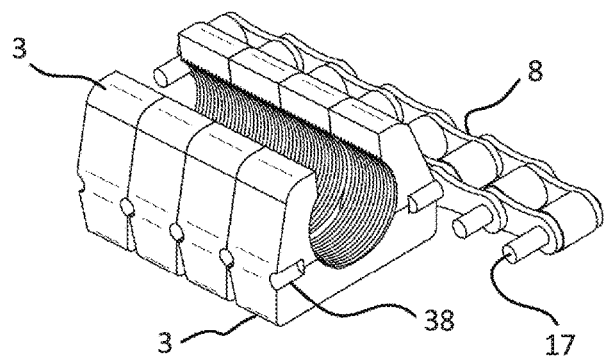
FIG. 17b is similar to FIG. 17a, with one of the parallel roller chains removed.
Figure 17C:
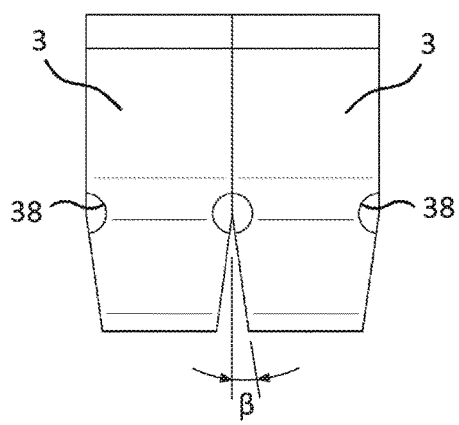
FIG. 17c shows the angle β in between two adjacent threaded bodies.

FIG. 17a shows a few threaded bodies (3) mounted on the extended rods (17) of two short tracts of the parallel roller chains (8). FIG. 17b shows a few threaded bodies (3) mounted on the extended rods (17) of a single short tract of a parallel roller chain (8) in order to show the spatial relation of the grooves (38) of several adjacent threaded bodies (3) and of the cuts that permits their rotation when they turn around the sprockets (9). Angle β of the cuts is shown in FIG. 17c.

The drive screws (1) and the threaded bodies (3) can have either single or multiple threads.

FIG. 16a shows a threaded link (18) of the threaded chain (16) completely assembled. FIG. 16b shows a threaded link (18) disassembled. As can be seen, it is made up of a threaded body (3) and two links (8e) of a roller chain (8).

Figure 17D:
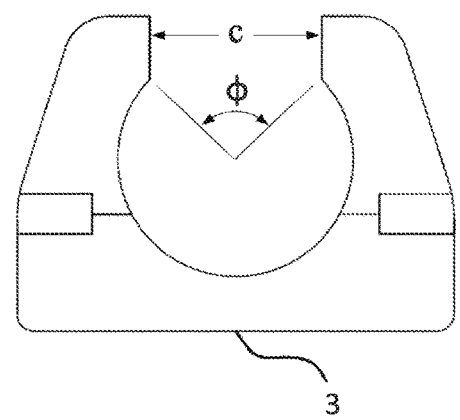
FIG. 17d shows the angle φ subtended by the gap in a threaded body.

The threaded bodies (3) have a gap (6), FIGS. 15 and 17d, wide enough to let shaft (2), of the drive screw (1), through.

Figure 18:
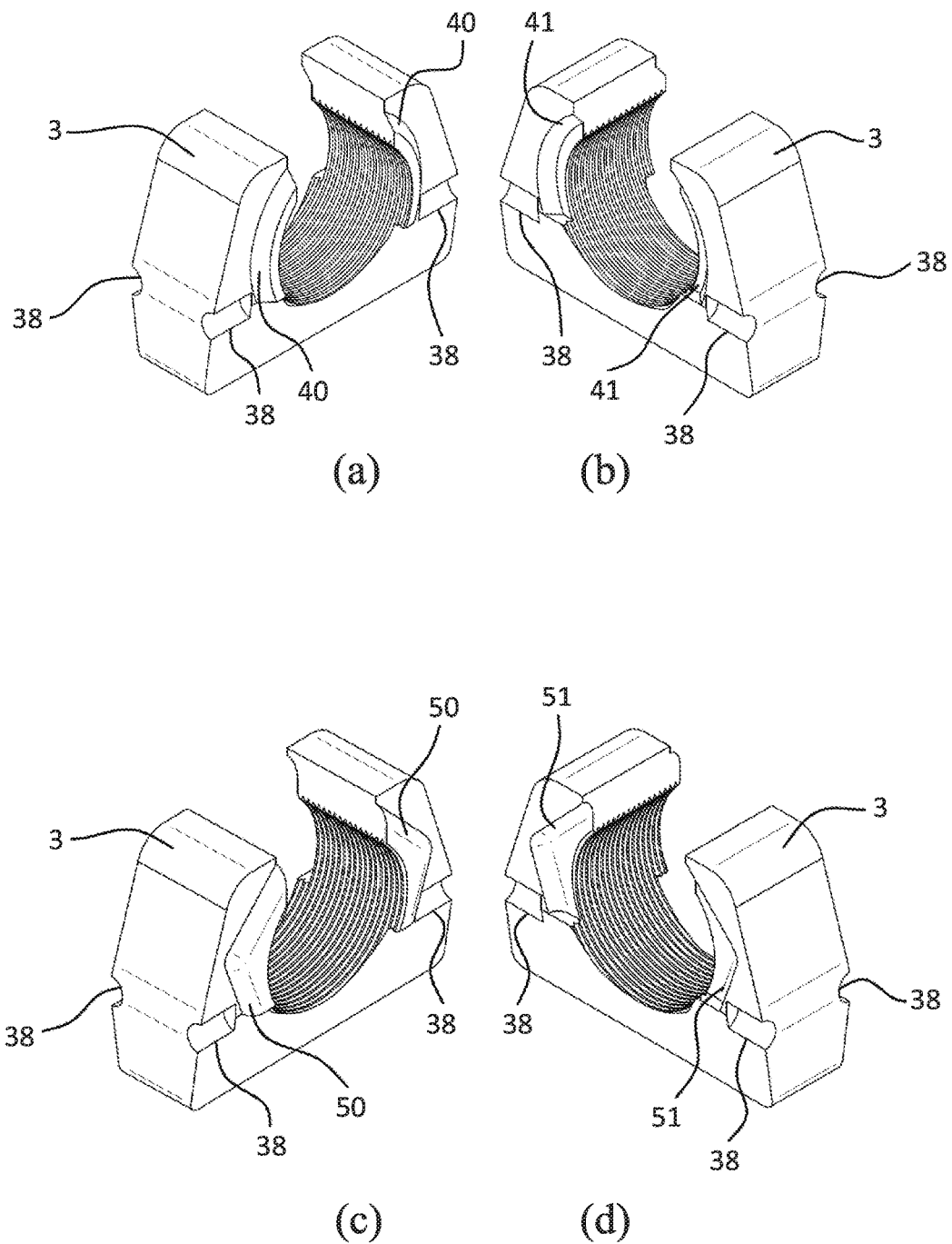
FIG. 18 shows two pairs of threaded bodies with slightly protruding and receding volumes: (a) and (b) in the shape of truncated cones; (c) and (d) in the shape of truncated pyramids.

FIG. 18a shows one side of a threaded body (3) with a protruding portion (40) in the shape of a truncated cone on one side, and a recessed portion (41), in the shape of a truncated cone on the other side, FIG. 18b. During operation the protruding portion (40) of a threaded body is coupled with the recessed portion (41) of the threaded body (3) next to it in the threaded chain (16), in order to promote the axial alignment of the threaded bodies (3). The protruding and recessed portions could be in the shape of truncated pyramids (50) and (51), FIGS. 18c and 18d respectively, so that in addition to promoting the axial alignment of the adjacent threaded bodies they would prevent the rotation of one relative to the other. Such a rotation is undesirable because it would result in a discontinuity of the threads.

Figure 20:
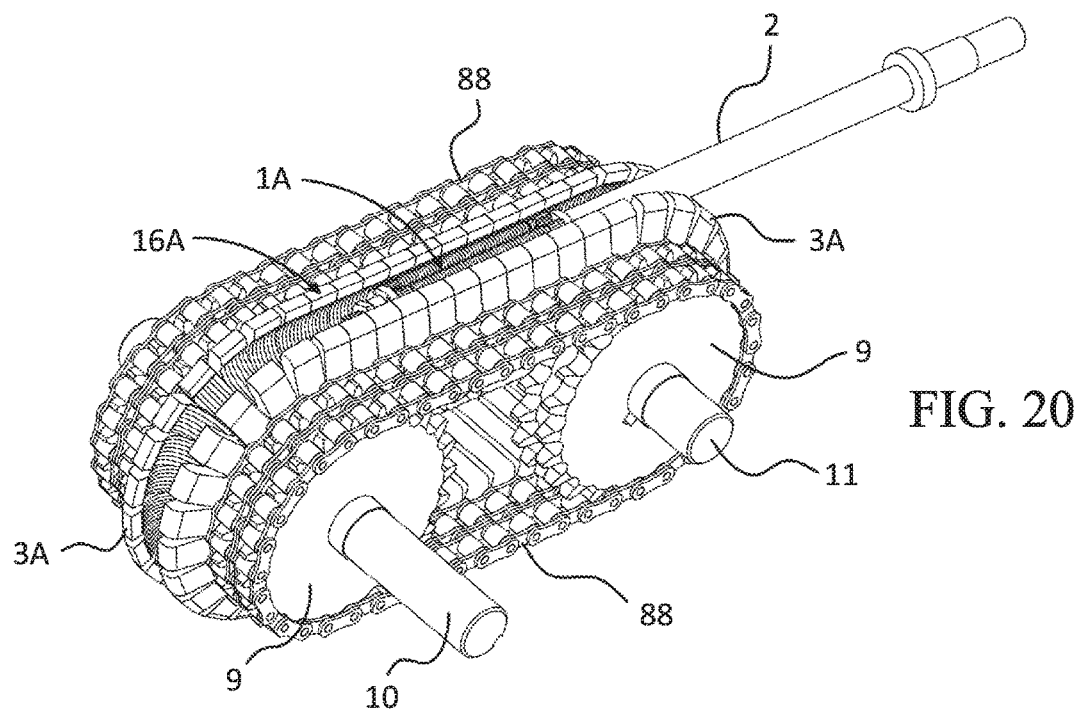
FIG. 20 shows the first embodiment of the reducer with a threaded chain with a pair of parallel two-strand roller chains with extended rods.

Parallel chains (8) may be either roller or silent (inverted tooth) chains or they may be toothed belts. If chains (8) are roller chains they may be either single strand or multiple strand: double, triple, etc., depending on the design load. The silent chains (89) would have extended rods (17), FIG. 22, with circular cross section to support and act as pivots of the threaded bodies (3). FIG. 20 shows a speed reducer with a two strand chains (88).

Figure 21:
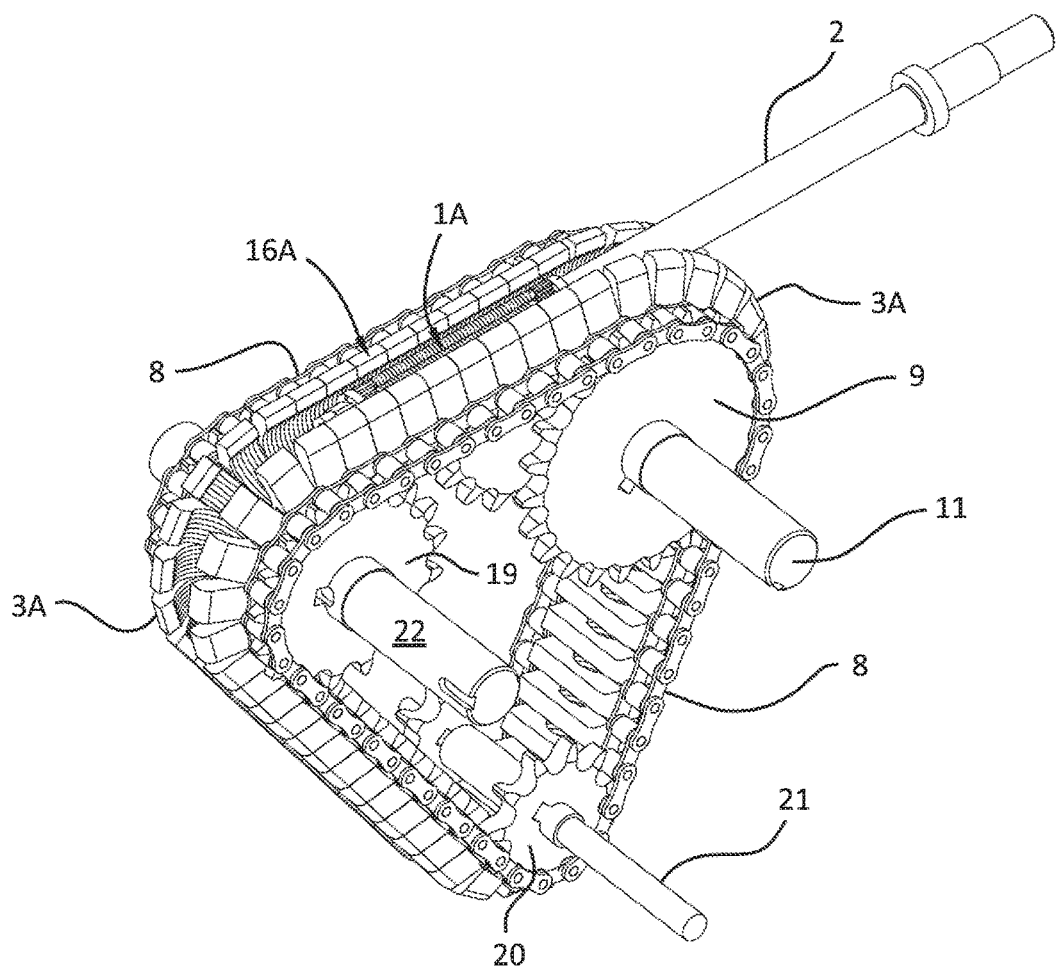
FIG. 21 shows a configuration of the present invention with three output shafts, i.e., with three different reduction ratios.

In other variants, the threaded chain (16) could drive three, four, or more pairs of sprockets of different diameters with their respective output shafts in order to have several different reduction ratios. For example in the variant of FIG. 21 there are three pairs of sprockets, (9), (19) and (20), with their output shafts: (11), (22) and (21), respectively.

As it has already been mentioned the use of the threaded chain (16) in this invention results in a great increase in the load capacity by comparison to the worm gear reducer. In addition to this, there is also a significant decrease of wear since the contact area of the power transmitting elements may be much greater and, consequently, the contact pressure may be much lower. It is also lower than in the case of the speed reducers described in the Wolander patent U.S. Pat. No. 595,508 and the patent application by Yuuji JP2000-097293.

In U.S. Pat. No. 595,508 by Wolander and in patent application DE2406360 A1 by Werther, brackets are included to maintain the contact between the drive screw and the driven chain. The brackets have rims to restrain the lateral displacement of the chain as well as its angular displacement about the drive screw axis. This is not necessary in the case of the present invention because the threaded bodies envelop the drive screw in an arc greater than 180° and because they are mounted on the extended rods of two parallel roller chains which are a considerable distance apart.

Comparing the inverted roller screw reducer of the first embodiment with the ball screw reducer of the second embodiment: for equal diameters and lengths of both screws the contact surface of the inverted roller screw is much greater than that of the ball screw so that the load capacity of the inverted roller screw is an order of magnitude greater than that of the ball screw and its useful life expectancy is also an order of magnitude greater.

This invention has been described in terms of three embodiments and several variations, permutations and equivalencies that fall within the scope of this invention. Also, it is clear that there are many different ways to implement the devices and methods of the present invention. Therefore, it is expected that the following claims will be interpreted including all such alterations, permutations and equivalencies that fall within the spirit and scope of the present invention.

What is claimed is:

1. A speed reducer comprising:
a high speed assembly, and
a low speed assembly;
wherein,
the high speed assembly comprises a drive screw including its shaft and supporting bearings;
the low speed assembly comprises an endless threaded chain transmission which comprises a threaded chain, at least two shafts with a pair of equal diameter sprockets fixed on each shaft, said shafts mounted on supporting bearings, the threaded chain mounted on the sprockets;
wherein the threaded chain comprises a plurality of threaded bodies carried by two parallel endless chains with extended rods;
wherein each threaded body has four cylindrical grooves, two on one side and two on an opposite side, with axes crosswise relative to the axis of the threaded cylindrical surface of the threaded body, so that the centroid of said threaded surface lies on the plane determined by the four axes of the grooves,
wherein each groove of each threaded body shares its geometrical axis with a groove of an adjacent threaded body,
wherein each one of said parallel endless chains has as many links as there are threaded bodies; so that each extended rod of a chain fits into the space in-between two said adjacent grooves;
wherein the threads of the drive screw engage the threads of the threaded chain transmission along a straight stretch of said threaded chain;
wherein the drive screw rotation causes a linear displacement of the plurality of threaded bodies which results in the linear displacement of the threaded chain;
wherein the threaded chain causes the rotation of the sprockets together with their shafts;

wherein the drive screw shaft is usually the high speed input shaft and each of the sprocket shafts are usually the low speed output shafts.

2. The speed reducer according to claim 1, wherein the drive screw is an inverted roller screw with rolling contact.

3. The speed reducer, according to claim 2, wherein, at least, one of the shafts of the threaded chain transmission is the input shaft, externally driven, and the shaft of the inverted roller screw is the output shaft, coupled to a load; since, in view of the rolling contact between the inverted roller screw and the threaded bodies, the reducer operates as a speed amplifier.

4. The speed reducer, according to claim 1, wherein the drive screw is a conventional translation screw with sliding contact.

5. The speed reducer, according to claim 1, wherein the parallel endless chains, which are part of the threaded chain are single strand roller chains.

6. The speed reducer, according to claim 1, wherein the parallel endless chains, which are part of the threaded chain are multiple strand roller chains, with extended rods, and their sprockets are multiple in accordance with the threaded chain.

7. The speed reducer, according to claim 1, wherein the parallel endless chains are inverted tooth chains, better known as silent chains, with extended cylindrical rods, and the sprockets are silent chain sprockets.

8. The speed reducer, according to claim 1, wherein the drive screw and the threaded bodies have a single entrance thread.

9. The speed reducer, according to claim 1, wherein the drive screw and the threaded bodies have multiple entrance threads.

10. The speed reducer, according to claim 1, wherein the threaded bodies have a low protrusion on one side and a shallow depression on the opposite side; the protrusion of a threaded body fits into the depression of the next threaded body in the threaded chain.

11. The speed reducer, according to claim 10, wherein the low protrusion and the shallow depression have the shape of a portion of a truncated cone.

12. The speed reducer, according to claim 10, wherein the low protrusion and the shallow depression have the shape of a portion of a truncated pyramid.

13. The speed reducer, according to claim 1, wherein the diameter of the pair of sprockets on one shaft are equal to the diameter of the pair of sprockets on the other shaft.

14. The speed reducer, according to claim 1, wherein the diameter of the pair of sprockets on one shaft are different from the diameter of the pair of sprockets on the other shaft.

15. The speed reducer, according to claim 1, wherein the threaded chain drives a multiple number of shafts, and the diameters of the pair of sprockets on each shaft is different from the diameter of the pair of sprockets on any other shaft.

* * * * *